July 9, 1946.  H. P. PHILLIPS  2,403,455
PISTON
Filed April 9, 1945

INVENTOR.
HAROLD P. PHILLIPS.
BY
Earl D. Chappell
ATTORNEYS.

Patented July 9, 1946

2,403,455

UNITED STATES PATENT OFFICE 2,403,455

PISTON

Harold P. Phillips, Hastings, Mich., assignor to Hastings Manufacturing Company, Hastings, Mich., a corporation of Michigan Application April 9, 1945, Serial No. 587,357

3 Claims. (Cl. 309—4)

This invention relates to improvements in pistons.

The main objects of this invention are:

First, to provide a piston for internal combustion engines in which the edges of the piston ring grooves are provided with wear resisting surfaces to minimize wear at the edges of the grooves, prolonging the life of the piston and piston rings and maintaining the efficiency of the piston.

Second, to provide a piston having these advantages which may be economically produced and employed in engines now in extensive use.

Third, to provide a structure having these advantages which may be very economically produced and not only prolongs the life of the piston rings but of the piston.

Objects pertaining to details and economies of the invention will definitely appear from the description to follow. The invention is defined in the claims.

A structure which embodies the features of the invention is clearly illustrated in the accompanying drawing, in which.

It should be understood that in the accompanying drawing I have not attempted to illustrate clearances and manufacturing tolerances as these are well understood in the art and vary in accordance with engineering specifications. It will be further understood that I have not attempted to illustrate the parts in their relative proportions.

Figure 1:
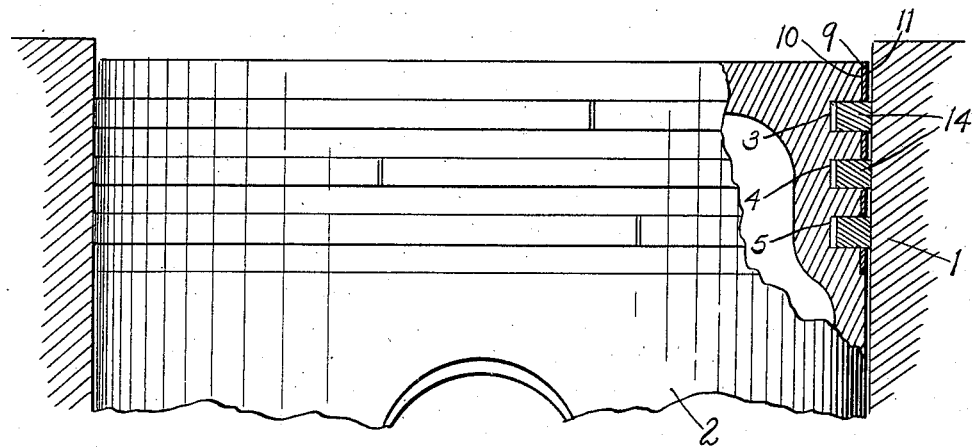
Fig. 1 is a fragmentary view partially in longitudinal section of a cylinder and a piston embodying my invention, parts being shown mainly in conventional form.
Figure 2:
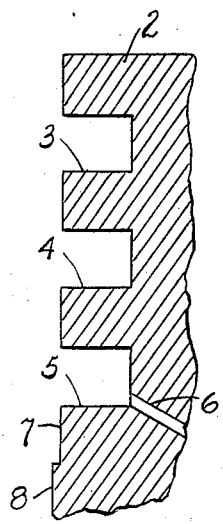
Fig. 2 is an enlarged longitudinal section of a piston with the ring belt area thereof turned down to receive a chrome plating.
Figure 3:
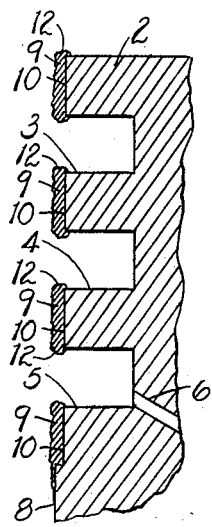
Fig. 3 is a fragmentary sectional view corresponding to Fig. 2 with the plating applied in excess to the finished plating and prior to machining.
Figure 4:
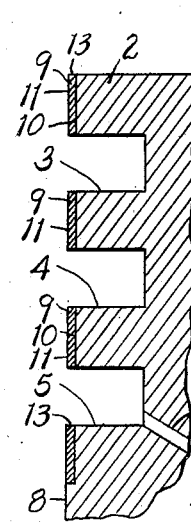
Fig. 4 is an enlarged fragmentary section through the ring belt area of a completed piston.

In the accompanying drawing 1 represents a cylinder and 2 a piston which may desirably be of cast iron. The piston may be cast in the usual way to the proper dimensions for machining. The piston is provided with a plurality of piston ring grooves 3, 4 and 5, the groove 5 being the oil ring groove and having drain openings 6. The ring belt area designated generally by the numeral 7 is turned down to a substantially less diameter than the adjacent peripheral wall surface 8 as is illustrated in Fig. 2. This ring belt area is provided with a chrome plating 9 for the lands 10 at the sides of each piston ring groove. This plating is preferably applied to a depth exceeding the diameter of the adjacent wall surface 8 of the piston and the plating is then ground down so that the peripheral surfaces 11 thereof are approximately flush with the peripheral surface 8, due allowance commonly being made for the expansion differentials. In the plating, the edges of the plating will lap over somewhat as shown at 12 in Fig. 3 on to the sides of the piston ring groove and these portions 12 are ground off so that the edges 13 of the plated lands are flush with the sides of the piston ring grooves and present wear resisting-surfaces to the sides of the piston rings 14 arranged within the grooves.

The piston rings 14 illustrated are all of the conventional type but it will be understood that the piston is adapted to receive any type of ring and has advantages for use with practically all types of compression rings which have to my knowledge reached substantial commercial use.

Figure 6:
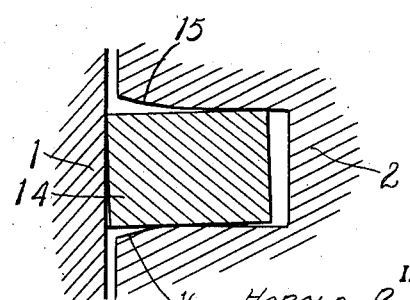
Fig. 6 is an enlarged fragmentary sectional view illustrating the wear of the walls of the piston groove which ordinarily results from use. While the sides of a piston ring are also worn in use, that is not shown in this figure.

In Fig. 6 I illustrate the wall of the piston ring groove worn away at 15 and 16 as results from use, particularly in the compression ring grooves. This not only results in decreasing the efficiency of the compression ring but increases the wear thereon. I have not attempted to illustrate the wear on the piston ring but that is well understood by automotive and internal combustion engine engineers.

By chrome plating the lands at the sides of the piston ring grooves a wear resisting edge of substantial thickness is presented at the edges of the ring grooves and the life and efficiency of the piston and piston rings are substantially increased. A plating in the order of .010 of an inch in thickness is easily provided and is efficient for the purpose intended. The plating might be applied with great care so that machining operations would not be required, but I prefer to apply the plating to a thickness substantially exceeding the finished work and then grind down to the desired thickness as that enables building up the reduced ring belt area to the same diameter as the adjacent area of the piston.

Figure 7:
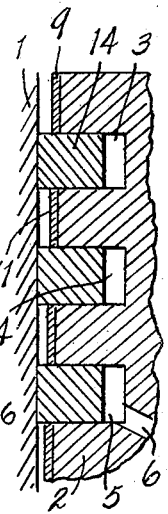
Fig. 7 is an enlarged fragmentary section corresponding to Fig. 4 in which I have illustrated the common practice of relieving the lands of the piston ring grooves to compensate for the additional expansion of the piston at the head portion thereof.
Figure 5:
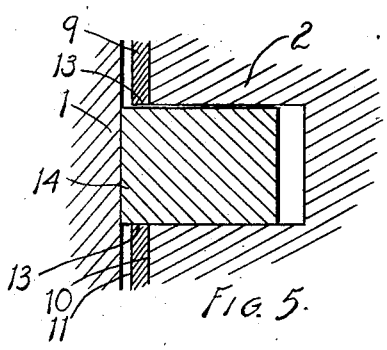
Fig. 5 is an enlarged fragmentary sectional view through one of the piston ring grooves having a piston ring therein showing the relation of the piston ring to the piston ring groove and the chrome plating on the lands at the sides of the groove.

In Fig. 7, I have attempted to illustrate the common practice of relieving the lands of the piston ring grooves in stepped relation toward the head of the piston so as to compensate for the additional expansion of the head of the piston. It is not attempted to illustrate this in proportion but it is rather common practice to relieve or step these lands from .010 to .030 depending on the size of the piston and the material from which it is made. This results in the lands being from .010 to .030 less diameter than the skirt or body portion of the piston. It is also recognized that sometimes the ring belt area of the piston is tapered upwardly instead of being in graduated steps as I have here illustrated. I have not attempted in Figs. 1 to 4 inclusive to illustrate this variation in diameter but it is a commonly recognized factor in internal combustion engine engineering. It does not, however, affect the importance of my invention but rather stresses the importance.

While I preferably use cast iron or other ferrous metal, non-ferrous metals may be employed for the body of the piston, and while I preferably provide the chrome plated lands for all of the piston ring grooves, it is perhaps most important for the lands of the compression ring groove. As stated, I have not attempted to show clearances, tolerances or proportions and the drawing is largely conventionalized. It is believed, however, that this disclosure will enable those skilled in the art to embody or adapt the invention as may be desired.

Having thus described my invention, what I claim as new and desire to secure by Letters Patent is:

1. A cast iron piston having a peripheral ring belt area of substantially less diameter than that of the adjacent wall area of the piston, said ring belt area having a plurality of axially spaced piston ring grooves therein, the reduced ring belt area extending below the inner wall of the piston ring grooves, said reduced piston ring belt area having a chrome plating of substantial thickness, the edges of plating being flush with the edges of the ring grooves and presenting wear surfaces to the side of piston rings arranged in the grooves.

2. A ferrous metal piston having a peripheral ring belt area of less diameter than the adjacent wall area of the piston, said ring belt area having a piston ring groove therein, said reduced piston ring belt area having a chrome plating of substantial thickness whereby the chrome plated lands at the sides of the piston ring groove are approximately flush with the wall of the piston adjacent the ring belt area, the edges of the plating being flush with the edges of the ring groove and presenting wear resisting surfaces to the sides of a piston ring arranged in the groove.

3. A piston provided with a piston ring groove, the lands at the sides of the groove having a chrome plating of substantial thickness, the edges of the plating being flush with the edges of the ring groove and presenting wear-resisting surfaces to the sides of a piston ring arranged in the groove.

HAROLD P. PHILLIPS.